United States Patent Office 3,192,275
Patented June 29, 1965

3,192,275
PROCESS FOR MAKING FULVENES
Werner Freiesleben, Munich, Bavaria, Germany, assignor to Consortium für Elektrochemische Industrie G.m.b.H., Munich, Bavaria, Germany, a corporation of Germany
No Drawing. Filed Aug. 7, 1962, Ser. No. 215,299
Claims priority, application Germany, Sept. 1, 1961, C 24,985
16 Claims. (Cl. 260—666)

This invention relates to the manufacture of fulvenes, and it has for its object to provide a novel and improved process for this purpose.

Another object of the invention is to provide a process for producing fulvenes practically quantitatively, without any by-products.

Various other objects and advantages will be apparent as the nature of the invention is more fully disclosed.

It is known to make fulvenes by condensation of cyclopentadiene or its homologues with carbonyl compounds in the presence of alkaline condensing agents. Described as such are alcoholates of lower aliphatic alcohols, aqueous or alcoholic caustic alkaline solutions, alcoholic $NH_3$-solutions, etc. (Jour. Am. Soc. 67; 1945, p. 1237). Also a proposal has been made in French Patent #1,134,170 to carry out the condensation in the presence of anion exchangers, and U.S. Patent #2,589,969 describes a process according to which dimethyl fulvene is obtained by reacting dicyclopentadiene and acetone over activated bauxite at temperatures of 200–480° C.

In all processes so far known considerable quantities of useless resinous residues are obtained as by-products and the fulvenes are obtained in a maximum yield of only 80%, but on the average about 50–75%.

I have now discovered a process for producing fulvenes practically quantitatively without any by-products, through the condensation of polyenes containing at least one $CH_2$-group allyl to two double bonds with aldehydes and ketones. According to the process of my invention, which might be performed continuously, also polyenes containing at least one $CH_2$ group with two adjacent double links are reacted with aldehydes or ketones in the presence of primary and/or secondary amines.

In the simplest way of carrying out the process of my invention the starting materials, e.g. monomeric cyclopentadiene and acetone, are mixed at room temperature in equimolar quantities and approximately 15 mol percent of the carbonyl compound of amine employed, e.g. methylamine, is added in the form of a commercial, approximately 30% aqueous, solution. The formation of fulvene starts immediately, and after several minutes it is practically ended as far as quantity is concerned. No by-products or residues are formed during this reaction.

The raw fulvene product merely contains small amounts of dissolved amine and is washed according to the degree of purity required, or it is rectified. The fulvenes obtained in this manner have an additional advantage: the presence of traces of amine which cannot even be proven gaschromatographically stabilizes the fulvenes against the undesirable development of peroxides during storage.

The process of the invention can be carried out within a wide temperature range between −20° C. and 250° C. and above in the liquid phase as well as in the vapor phase, the optimum reaction temperature being determined by economic factors (energy required, space speed, etc.). In general the process can be carried out at room temperature and under normal pressure; for some fulvenes, or when short reaction periods are desired, higher temperatures and lower or higher pressures are indicated. The sequence of mixing the components may be as desired.

As starting materials for making fulvenes according to the process of the invention, can be used: cyclopentadiene and its substitution products, preferred groups are for instance alkyl substitution products like 2,3-dimethyl-cyclopentadiene, 2-methyl-cyclopentadiene, 2-ethyl-cyclopentadiene, aryl substitution products like 2,3,4,5-tetraphenyl-cyclopentadiene, and halogen substitution products like 2,3,4,5-tetrachlorcyclopentadiene. However, substances like indene, fluorene, cycloheptatriene or 1,4-pentadiene can also be used. In reactions carried out above 150° C., dicyclopentadiene which is thermally split at these temperatures can also be used instead of monomeric cyclopentadiene.

Ketones used for the making of fulvenes are predominantly acetone, methylethyl ketone, 2-chlorobutanone-3, diethylketone, methylvinyl ketone, isopropylmethyl ketone, isobutylmethyl ketone, acetophenone. The following aldehydes are named by way of example: acetaldehyde, propionic aldehyde, butyric aldehyde, croton aldehyde, benzaldehyde, 2-ethylhexaldehyde, methylalheptene.

Of the primary and/or secondary amines used as condensing agents, in general all those are suitable which enter into a Mannich reaction, as for instance the amines shown in the tables on pages 307 and 312 of "Organic Reactions," vol. I, New York, 1954. In particular I mention methylamine (as an aqueous solution), n-butylamine, isobutylamine, diethylamine, n-hexylamine, isopropylamine, methylhydrazine, ethylene diamine, hexamethylene diamine, benzylamine, piperidine, morpholine, piperazine.

According to the process of the invention polyene and carbonyl compounds are used preferably in stoichiometric proportions, while the quantity of the condensing agent used can be varied within wide limits. Concentrations of 2 mol percent and less of the carbonyl compound are still effective for the condensation. However, it is advantageous to use concentrations between 5 and 30 mol percent. The condensing agent has a purely catalytic function and is not consumed during the reaction.

The carrying out of the process of the invention is illustrated by the following examples, which, however, are not to be taken as limiting the field of application of the process.

Example 1

In a reaction vessel 33 kg. (=500 mol) of monomeric cyclopentadiene and 29 kg. (=500 mol) acetone were mixed at room temperature and 7.7 kg. of a 33% aqueous methylamine solution (=75 mol $CH_3NH_2$) were added. After 25 minutes the reaction mixture had separated into two layers, of which the upper one (53.2 kg.) was separated and rectified through a column. After a preliminary run of 320 g., which contained 72 g. acetone and 248 g. water, 52.8 kg. of pure 6,6-dimethyl fulvene were distilled at 44–46° C. under 10 mm. mercury pressure, which with respect to the acetone transformed represents a yield of 99.8%.

Example 2

A heatable reaction pipe filled with Raschig rings, equipped with an intake nozzle, a reflux condenser, and on the lower end with an inert gas inlet and outlet, was heated to 85° C. and during the initial period of 5 minutes it was fed 330 g. (=5 mol) monomeric cyclopentadiene and 290 g. (=5 mol) acetone containing 20 g. (=0.274 mol) n-butylamine in solution, while a weak stream of nitrogen was directed against the reaction mixture. During the same time 618 g. of raw product was drawn off at the lower end, which was distilled in fractions. After an initial run at normal pressure of 114 g., containing 11 g. of cyclopentadiene, 10 g. acetone, 6 g. n-butylamine, and 87 g. water at 10 torr, 502 g. of pure 6,6-dimethyl fulvene were obtained of 44–45° C. boiling point, which corresponds with a yield of 98.1% in relation to the acetone transformed.

*Example 3*

According to the procedure in Example 2, 330 g. (=5 mol) of monomeric cyclopentadiene and 290 g. (=5 mol) of acetone were reacted in the presence of 40 g. (=0.548 mol) diethylamine at 70–75° C. 613 g. of raw product was collected, from which 505 g. of pure 6,6-dimethyl fulvene were obtained, corresponding with a yield of 98.2% in relation to the acetone transformed.

*Example 4*

According to the process of Example 1, 330 g. (=5 mol) monomeric cyclopentadiene and 360 g. (=5 mol) methylethyl ketone were reacted in the presence of 30 g. (=0.41 mol) n-butylamine at room temperature. 608 g. of raw product was obtained, from which 578 g. of 6,6-methylethyl fulvene, boiling point of 58–59° C. at 10 mm. of mercury pressure, were obtained, corresponding to a yield of 97.8% in relation to the acetone transformed.

*Example 5*

As in Examples 2 and 3, 330 g. (=5 mol) monomeric cyclopentadiene and 430 g. (=5 mol) diethyl ketone containing 35 g. (=0.35 mol) isopropylamine were reacted at 110° C. in the course of 15 minutes. 748 g. of raw product was drawn off, from which 624 g. of 6,6-diethyl fulvene, boiling point 62.5–64° C. at 10 mm. of mercury pressure, were obtained (yield 97.8%).

*Example 6*

According to the process followed in the foregoing examples, 330 g. (=2.5 mol) dicyclopentadiene and 600 g. (=5 mol) acetophenone were reacted in the presence of 65 g. (=0.5 mol) di-isobutylamine at 180–190° C. in the course of ½ hour. 912 g. of raw product was drawn off, from which 788 g. of 6,6-methylphenyl fulvene, with a boiling point of 127–128° C. at 10 mm. of mercury pressure, were obtained (yield 96.9%).

*Example 7*

In a manner analogous with the process of Example 1, 330 g. (=5 mol) of monomeric cyclopentadiene were reacted with 430 g. (=5 mol) of isopropylmethyl ketone in the presence of 40 g. (=0.548 mol) n-butylamine at room temperature during 50 minutes. 679 g. of raw product was obtained, from which 648 g. of 6,6-isopropylmethyl fulvene, boiling point 64–66° C. at 10 mm. of mercury pressure, was obtained (yield 97.1%).

*Example 8*

Pursuant to the process of Example 1, 330 g. (=5 mol) monomeric cyclopentadiene and 500 g. (=5 mol) isobutylmethyl ketone were reacted in the presence of 51 g. (=0.6 mol) piperidine at room temperature during ½ hour. 738 g. of raw product was separated, from which 728 g. of 6,6-isobutylmethyl fulvene, boiling point 86–88° C. at 10 mm. of mercury pressure, were obtained (yield 98.5%).

*Example 9*

As in the procedure of Examples 2–6, 330 g. (=5 mol) of monomeric cyclopentadiene were transformed with 350 g. (=5 mol) of crotonaldehyde in the presence of 5 g. (=0.068 mol) n-butylamine at 110° C. during ½ hour. From 653 g. of raw product, 524 g. of the blood-red 6-allyl fulvene, boiling point 68–69° C. at 10 mm. of mercury pressure, were obtained (yield 87.4%).

*Example 10*

At room temperature 16 g. (≈0.15 mol) of benzylamine were dissolved in 58 g. (=1 mol) acetone, and the solution was mixed with 66 g. (=1 mol) monomeric cyclopentadiene. After 15 minutes 108 g. of raw 6,6-dimethyl fulvene had separated, from which 101 g. of gas-chromatographically pure fulvene was obtained by distillation (yield 97.3%).

*Example 11*

As in the preceding example, 58 g. of acetone and 17.4 g. (=0.15 mol) hexamethylene diamine were mixed and reacted with 66 g. monomeric cyclopentadiene. After 30 minutes 105 g. of raw dimethyl fulvene were separated, from which 98 g. of pure product was obtained (yield 96.4%).

*Example 12*

4.7 g. of a 33% methylamine solution (=0.05 mol) were dissolved in 63 g. of a 70% aqueous solution of acetaldehyde (=1 mol) and 66 g. (=1 mol) of monomeric cyclopentadiene were added. The reaction mixture was thoroughly stirred at room temperature for 45 minutes and subsequently it was processed the same way as described in the preceding examples. 88 g. of 6-methyl fulvene, boiling point 39–40° C. at 10 mm. mercury pressure, were obtained (yield 95.6%).

*Example 13*

58 g. propionic aldehyde (=1 mol) were mixed with 5 g. of a 33% methylamine solution (=0.049 mol) and reacted at room temperature with 66 g. of monomeric cyclopentadiene. After stirring for one hour the mixture was processed as in the preceding example. 102 g. of 6-ethyl fulvene, boiling point 54–55° C. at 10 mm. of mercury pressure, were obtained (yield 96.3%).

*Example 14*

53 g. (=0.5 mol) of benzaldehyde were mixed with 100 mg. (≈0.001 mol) phenylhydrazine and after adding 33 g. of cyclopentadiene, heated under reflux for 2 hours. After separation of 8.77 g. of water the remaining dark-red oil solidified at 0° C. to a crystal pulp, from which 48 g. of 6-phenyl fulvene, melting point 24–27° C. were obtained by re-crystallization with petroleum ether.

*Example 15*

58 g. (=1 mol) acetone were mixed with an excess of methylamine solution and slowly distilled in a fractionating column. The fraction between 52–54° C. contained 68% n-methyl acetonimine and 32% acetone. 15 g. of this mixture were reacted with 23.2 g. (=0.2 mol) of indene and left standing for 16 hours at room temperature. The reaction mixture had assumed a brown-violet color. It was fractionally distilled. At 133–135° C./10 mm. mercury, 15.3 g. of a yellowish oil were distilled out, which was found to be 6,6-dimethyl-1,2-benzo fulvene.

*Example 16*

37 g. (=0.1 mol) of 2,3,4,5-tetraphenylcyclopentadiene were added to a solution of 1.5 g (=0.02 mol) n-butylamine in 17.3 g. of 37% formaline solution (=0.2 mol) and diluted with 50 ml. of absolute ethanol. The reaction mixture was boiled under reflux for 4 hours, mixed with 200 ml. of water and extracted with ether. From the ether a very dark-red crystal pulp was obtained, which after re-crystallization from glacial acetic acid yielded fire-red flakes of 1,2,3,4-tetraphenyl fulvene of melting point 205–206° C. (yield 21 g.).

The invention claimed is:

1. Process for producing fulvenes which comprises reacting a substance selected from the group consisting of aldehydes and ketones with a polyene having at least one $CH_2$-group allyl to two double bonds, in the presence of a condensing agent selected from the group consisting of primary and secondary amines.

2. Process according to claim 1, in which the polyene is selected from the group consisting of cyclopentadiene and its substitution products, indene, fluorene, cycloheptatriene and 1,4-pentadiene.

3. Process according to claim 1, in which the ketone is selected from the group consisting of acetone, methylethyl ketone, 2-chlorobutanone-3, diethyl ketone, methylvinyl ketone, isopropylmethyl ketone, isobutylmethyl ketone, acetophenone.

4. Process according to claim 1, in which the aldehyde is selected from the group consisting of acetaldehyde, propionic aldehyde, butyric aldehyde, croton aldehyde, benzaldehyde, 2-ethylhexaldehyde, methylalheptene.

5. Process for producing 6,6-dimethyl fulvene which comprises reacting monomeric cyclopentadiene and acetone in the presence of a substance selected from the group consisting of methylamine, n-butylamine, diethylamine, benzylamine and hexamethylene diamine, separating the resulting layers of the reacted mixture and recovering said fulvene from the layer containing same.

6. Process for producing 6,6-methylethyl fulvene which comprises reacting monomeric cyclopentadiene and methylethyl ketone in the presence of n-butylamine, and recovering said fulvene from the reaction mixture.

7. Process for producing 6,6-diethyl fulvene which comprises reacting monomeric cyclopentadiene and diethyl ketone in the presence of isopropylamine, and recovering said fulvene from the reaction mixture.

8. Process for producing 6,6-methylphenyl fulvene which comprises reacting dicyclopentadiene and acetophenone in the presence of di-isobutylamine, and recovering said fulvene from the reaction mixture.

9. Process for producing 6,6-isopropylmethyl fulvene which comprises reacting monomeric cyclopentadiene and isopropylmethyl ketone in the presence of n-butylamine, and recovering said fulvene from the reaction mixture.

10. Process for producing 6,6-isobutylmethyl fulvene which comprises reacting monomeric cyclopentadiene and isobutylmethyl ketone in the presence of piperidine, and recovering said fulvene from the reaction mixture.

11. Process for producing 6-allyl fulvene which comprises reacting monomeric cyclopentadiene and crotonaldehyde in the presence of n-butylamine, and recovering said fulvene from thre reaction mixture.

12. Process for producing 6-methyl fulvene which comprises reacting monomeric cyclopentadiene and acetaldehyde in the presence of methylamine, and recovering said fulvene from the reaction mixture.

13. Process for producing 6-ethyl fulvene which comprises reacting monomeric cyclopentadiene and propionic aldehyde in the presence of methylamine, and recovering said fulvene from the reaction mixture.

14. Process for producing 6-phenyl fulvene which comprises reacting cyclopentadiene and benzaldehyde in the presence of phenylhydrazine, and recovering said fulvene from the reaction mixture.

15. Process for producing 6,6-dimethyl-1,2-benzo fulvene which comprises reacting indene with a mixture of n-methyl-acetonamine and acetone, and recovering the said fulvene from the reaction mixture.

16. Process for producing 1,2,3,4-tetraphenyl fulvene which comprises reacting 2,3,4,5-tetraphenylcyclopentadiene and a solution of n-butylamine and formaline, and recovering said fulvene from the reaction mixture.

References Cited by the Examiner
UNITED STATES PATENTS

| | | | |
|---|---|---|---|
| 2,512,698 | 6/50 | Thompson et al. | 260—668 |
| 2,589,969 | 3/52 | Schutze et al. | 260—666 |

OTHER REFERENCES

Faraday's Encyclopedia, vol. $C_8$ at page 08022.0011 (1958).

ALPHONSO D. SULLIVAN, *Primary Examiner*.